United States Patent
Liao et al.

(10) Patent No.: US 9,581,786 B2
(45) Date of Patent: Feb. 28, 2017

(54) IMAGING LENS ASSEMBLY

(71) Applicant: ABILITY OPTO-ELECTRONICS TECHNOLOGY CO., LTD., Taichung (TW)

(72) Inventors: Kuo-Yu Liao, Taichung (TW); Chen-Hung Tsai, Taichung (TW)

(73) Assignee: Ability Opto-Electronics Technology Co., LTD., Taichung (TW)

( * ) Notice: Subject to any disclaimer, the term of this patent is extended or adjusted under 35 U.S.C. 154(b) by 0 days.

(21) Appl. No.: 14/837,250

(22) Filed: Aug. 27, 2015

(65) Prior Publication Data

US 2016/0062079 A1 Mar. 3, 2016

(30) Foreign Application Priority Data

Aug. 28, 2014 (TW) .............................. 103129695 A

(51) Int. Cl.
*G02B 9/34* (2006.01)
*G02B 13/00* (2006.01)

(52) U.S. Cl.
CPC ............. *G02B 9/34* (2013.01); *G02B 13/004* (2013.01)

(58) Field of Classification Search
None
See application file for complete search history.

(56) References Cited

U.S. PATENT DOCUMENTS

| | | | |
|---|---|---|---|
| 2015/0002722 A1* | 1/2015 | Chang ................ | G02B 13/0045 348/335 |
| 2015/0062406 A1* | 3/2015 | Chen ................... | G02B 13/0045 348/335 |
| 2015/0160434 A1* | 6/2015 | Chen ..................... | H04N 5/2252 348/335 |
| 2015/0253538 A1* | 9/2015 | Ye ............................ | G02B 9/60 348/360 |
| 2015/0253539 A1* | 9/2015 | Ye ............................ | G02B 9/60 348/373 |
| 2015/0301310 A1* | 10/2015 | Chen .................. | G02B 13/0015 348/373 |

* cited by examiner

*Primary Examiner* — Darryl J Collins
(74) *Attorney, Agent, or Firm* — LeClairRyan

(57) ABSTRACT

An imaging lens assembly includes first, second, third and fourth optical lens elements that are arranged sequentially from an object side to an image side along an optical axis. The first optical lens element and at least one of the second, third and fourth optical lens elements have positive refractive powers near the optical axis. At least one of object-side and image-side surfaces of at least one of the second to fourth optical lens elements is aspheric. The imaging lens assembly satisfies the following optical conditions: $0.7 \leq |f/f1| \leq 1.0$, and $HFOV \geq 35$ deg, in which, f and f1 represent focal lengths of the imaging lens assembly and the first optical lens element, respectively, and HFOV stands for half field-of-view of the imaging lens assembly.

19 Claims, 25 Drawing Sheets

|  | Radius of Curvature (Radius) | Thickness (Thickness) | Refractive Index (Nd) | Abbe Number (Vd) | Focol Length |
|---|---|---|---|---|---|
| Fixed Aperture Stop 6 | ∞ | -0.099 |  |  |  |
| First Optical Lens Element 1 — Object-Side Surface 11 | 1.352 | 0.375 | 1.535 | 56.1 | 2.96 |
| First Optical Lens Element 1 — Image-Side Surface 12 | 8.225 | 0.309 |  |  |  |
| Second Optical Lens Element 2 — Object-Side Surface 21 | -2.494 | 0.324 | 1.535 | 56.1 | 2.864 |
| Second Optical Lens Element 2 — Image-Side Surface 22 | -0.994 | 0.178 |  |  |  |
| Third Optical Lens Element 3 — Object-Side Surface 31 | -0.465 | 0.231 | 1.636 | 22.9 | -2.356 |
| Third Optical Lens Element 3 — Image-Side Surface 32 | -0.800 | 0.224 |  |  |  |
| Fourth Optical Lens Element 4 — Object-Side Surface 41 | 0.954 | 0.602 | 1.535 | 56.1 | 5.546 |
| Fourth Optical Lens Element 4 — Image-Side Surface 42 | 1.095 | 0.356 |  |  |  |
| Filter 7 — Object-Side Surface 71 | ∞ | 0.21 | 1.517 | 64.17 |  |
| Filter 7 — Image-Side Surface 72 | ∞ | 0.583 |  |  |  |

FIG.3

| | Object-Side Surface (11) | Image-Side Surface (12) | Object-Side Surface (21) | Image-Side Surface (22) | Object-Side Surface (31) | Image-Side Surface (32) | Object-Side Surface (41) | Image-Side Surface (42) |
|---|---|---|---|---|---|---|---|---|
| k | 0.751 | 167.64 | 11.877 | -2.346 | -3.39 | -1.269 | -9.545 | -5.613 |
| A | -0.038 | -0.233 | -0.485 | -0.308 | -1.487 | -0.148 | -0.179 | -0.131 |
| B | -0.805 | 0.244 | 1.972 | -2.213 | 3.271 | 0.2 | -0.184 | 7.75*10^-3 |
| C | 4.281 | -4.704 | -17.773 | -11.784 | -1.962 | 1.027 | 0.347 | 0.030 |
| D | -20.44 | 16.463 | 72.652 | -34.374 | 0.108 | -1.507 | -0.266 | -0.023 |
| E | 76.154 | -37.373 | -156.327 | 60.567 | -3.302 | 0.516 | 0.118 | 7.635*10^-3 |
| F | -221.161 | 55.864 | 183.463 | -61.262 | 2.136 | 0.432 | -0.028 | -1.262*10^-3 |
| G | 285.458 | -51.953 | -74.414 | 28.215 | 0.639 | -0.143 | 2.70*10^-3 | 7.452*10^-5 |
| H | 0 | 0 | 0 | 0 | 0 | 0 | 0 | 0 |
| J | 0 | 0 | 0 | 0 | 0 | 0 | 0 | 0 |

FIG.4

| | | Radius of Curvature (Radius) | Thickness (Thickness) | Refractive Index (Nd) | Abbe Number (Vd) | Focol Length |
|---|---|---|---|---|---|---|
| Fixed Aperture Stop 6 | | ∞ | -0.076 | | | |
| First Optical Lens Element 1 | Object-Side Surface 11 | 1.5 | 0.328 | 1.535 | 56.07 | 2.883 |
| | Image-Side Surface 12 | 45.705 | 0.257 | | | |
| Second Optical Lens Element 2 | Object-Side Surface 21 | -2.766 | 0.473 | 1.535 | 56.07 | 2.707 |
| | Image-Side Surface 22 | -1.009 | 0.194 | | | |
| Third Optical Lens Element 3 | Object-Side Surface 31 | -0.374 | 0.279 | 1.636 | 23.89 | -1.335 |
| | Image-Side Surface 32 | -0.858 | 0.025 | | | |
| Fourth Optical Lens Element 4 | Object-Side Surface 41 | 0.638 | 0.63 | 1.535 | 56.07 | 1.833 |
| | Image-Side Surface 42 | 1.191 | 0.356 | | | |
| Filter 7 | Object-Side Surface 71 | ∞ | 0.21 | 1.517 | 64.17 | |
| | Image-Side Surface 72 | ∞ | 0.6 | | | |

FIG.7

| | Object-Side Surface (11) | Image-Side Surface (12) | Object-Side Surface (21) | Image-Side Surface (22) | Object-Side Surface (31) | Image-Side Surface (32) | Object-Side Surface (41) | Image-Side Surface (42) |
|---|---|---|---|---|---|---|---|---|
| k | 0.109 | 4.114 | 14.427 | -2.757 | -3.691 | -1.235 | -7.266 | -2.55 |
| A | -0.056 | -0.305 | -0.568 | -0.457 | 1.74 | -0.167 | -0.027 | -0.158 |
| B | -0.845 | -0.050 | 2.325 | -2.374 | 3.239 | 0.155 | -0.277 | 0.024 |
| C | 4.067 | -4.074 | -19.191 | 12.058 | -1.68 | 1.003 | 0.366 | 0.027 |
| D | -21.349 | 18.279 | 72.011 | -33.836 | 0.657 | -1.516 | -0.263 | -0.023 |
| E | 70.897 | -43.090 | -151.512 | 61.183 | -3.37 | 0.507 | 0.116 | $7.79*10^{\wedge}3$ |
| F | -197.869 | 8.528 | 190.595 | -61.839 | 1.392 | 0.405 | -0.028 | $-1.25*10^{\wedge}3$ |
| G | 251.383 | 72.763 | -93.948 | 24.173 | 0.096 | -0.202 | 0.003 | $7.38*10^{\wedge}5$ |
| H | 0 | 0 | 0 | 0 | 0 | 0 | 0 | 0 |
| J | 0 | 0 | 0 | 0 | 0 | 0 | 0 | 0 |

FIG.8

|  | | Radius of Curvature (Radius) | Thickness (Thickness) | Refractive Index (Nd) | Abbe Number (Vd) | Focol Length |
|---|---|---|---|---|---|---|
| Fixed Aperture Stop 6 | | ∞ | -0.128 | | | |
| First Optical Lens Element 1 | Object-Side Surface 11 | 1.497 | 0.396 | 1.544 | 56.09 | 3.198 |
| | Image-Side Surface 12 | 9.529 | 0.355 | | | |
| Second Optical Lens Element 2 | Object-Side Surface 21 | -4.263 | 0.498 | 1.544 | 56.09 | 2.919 |
| | Image-Side Surface 22 | -1.208 | 0.156 | | | |
| Third Optical Lens Element 3 | Object-Side Surface 31 | -0.496 | 0.408 | 1.643 | 22.47 | -2.402 |
| | Image-Side Surface 32 | -0.965 | 0.031 | | | |
| Fourth Optical Lens Element 4 | Object-Side Surface 41 | 1.139 | 0.972 | 1.535 | 56.07 | 4.377 |
| | Image-Side Surface 42 | 1.553 | 0.375 | | | |
| Filter 7 | Object-Side Surface 71 | ∞ | 0.21 | 1.517 | 64.17 | |
| | Image-Side Surface 72 | ∞ | 0.74 | | | |

FIG.11

|   | Object-Side Surface (11) | Image-Side Surface (12) | Object-Side Surface (21) | Image-Side Surface (22) | Object-Side Surface (31) | Image-Side Surface (32) | Object-Side Surface (41) | Image-Side Surface (42) |
|---|---|---|---|---|---|---|---|---|
| k | 0.585 | 77.845 | 32.389 | -5.572 | -3.778 | -1.535 | -12.518 | -4.663 |
| A | -0.033 | -0.146 | -0.308 | -0.325 | -1.095 | -0.129 | -0.073 | -0.063 |
| B | -0.269 | 0.144 | 0.977 | -1.508 | -1.737 | 0.083 | -0.081 | -1.13*10^-3 |
| C | 1.558 | -2.233 | -8.117 | 5.333 | -1.141 | 0.48 | 0.144 | 0.015 |
| D | -8.673 | 6.689 | 26.858 | -12.439 | 0.285 | -0.558 | -0.105 | -8.56*10^-3 |
| E | 25.842 | -12.677 | -52.270 | 18.875 | -0.017 | 0.143 | 0.039 | 2.26*10^-3 |
| F | -43.274 | 9.165 | 41.977 | -15.746 | 1.387 | 0.076 | -5.35*10^-3 | -2.73*10^-4 |
| G | 28.016 | 0.070 | 2.109 | 5.273 | -2.226 | -0.035 | -2.23*10^-4 | 9.77*10^-6 |
| H | 0 | 0 | 0 | 0 | 0 | 0 | 0 | 0 |
| J | 0 | 0 | 0 | 0 | 0 | 0 | 0 | 0 |

FIG.12

| | Radius of Curvature (Radius) | Thickness (Thickness) | Refractive Index (Nd) | Abbe Number (Vd) | Focal Length |
|---|---|---|---|---|---|
| Fixed Aperture Stop 6 | ∞ | -0.092 | | | |
| First Optical Lens Element 1 — Object-Side Surface 11 | 0.852 | 0.307 | 1.544 | 56.09 | 1.752 |
| First Optical Lens Element 1 — Image-Side Surface 12 | 6.802 | 0.185 | | | |
| Second Optical Lens Element 2 — Object-Side Surface 21 | -2.481 | 0.280 | 1.544 | 56.09 | 1.761 |
| Second Optical Lens Element 2 — Image-Side Surface 22 | -0.720 | 0.076 | | | |
| Third Optical Lens Element 3 — Object-Side Surface 31 | -0.310 | 0.187 | 1.642 | 22.47 | -2.07 |
| Third Optical Lens Element 3 — Image-Side Surface 32 | -0.498 | 0.025 | | | |
| Fourth Optical Lens Element 4 — Object-Side Surface 41 | 0.705 | 0.345 | 1.544 | 56.09 | 21.64 |
| Fourth Optical Lens Element 4 — Image-Side Surface 42 | 0.620 | 0.237 | | | |
| Filter 7 — Object-Side Surface 71 | ∞ | 0.21 | 1.517 | 64.17 | |
| Filter 7 — Image-Side Surface 72 | ∞ | 0.322 | | | |

FIG.15

| | Object-Side Surface (11) | Image-Side Surface (12) | Object-Side Surface (21) | Image-Side Surface (22) | Object-Side Surface (31) | Image-Side Surface (32) | Object-Side Surface (41) | Image-Side Surface (42) |
|---|---|---|---|---|---|---|---|---|
| k | 0.849 | 228.938 | 7.206 | -1.195 | -4.198 | -2.249 | -16.835 | -6.472 |
| A | -0.236 | -0.527 | -1.548 | -1.375 | -4.871 | -0.227 | -1.31 | -0.848 |
| B | -3.346 | 1.272 | 13.232 | -16.529 | 26.050 | 1.259 | -1.686 | 0.793 |
| C | 58.851 | -68.795 | -297.875 | 210.695 | -31.951 | 16.358 | 7.960 | -0.162 |
| D | -879.166 | 667.159 | 2664.117 | -1282.293 | 15.951 | -59.328 | -10.126 | -1.021 |
| E | 76.06.287 | -3517.374 | -1.38*10^4 | 5264.328 | -141.54 | 55.855 | 9.291 | 1.020 |
| F | -3.62*10^4 | 8239.427 | 3.77*10^4 | -1.27*10^4 | 338.743 | 135.663 | -.179 | -0.107 |
| G | 6.90*10^4 | -7898.098 | -3.51*10^4 | 1.24*10^4 | -1588.961 | -319.743 | -81.397 | -0.107 |
| H | 0 | 0 | 0 | 0 | 0 | 0 | 0 | 0 |
| J | 0 | 0 | 0 | 0 | 0 | 0 | 0 | 0 |

FIG.16

| | | Radius of Curvature (Radius) | Thickness (Thickness) | Refractive Index (Nd) | Abbe Number (Vd) | Focol Length |
|---|---|---|---|---|---|---|
| Fixed Aperture Stop 6 | | | -0.101 | | | |
| First Optical Lens Element 1 | Object-Side Surface 11 | 1.226 | 0.336 | 1.535 | 56.07 | 2.61 |
| | Image-Side Surface 12 | 8.825 | 0.298 | | | |
| Second Optical Lens Element 2 | Object-Side Surface 21 | -3.342 | 0.530 | 1.535 | 56.07 | 2.32 |
| | Image-Side Surface 22 | -0.958 | 0.147 | | | |
| Third Optical Lens Element 3 | Object-Side Surface 31 | -0.398 | 0.25 | 1.64 | 23.26 | -1.72 |
| | Image-Side Surface 32 | -0.773 | 0.059 | | | |
| Fourth Optical Lens Element 4 | Object-Side Surface 41 | 0.830 | 0.730 | 1.535 | 56.07 | 3.03 |
| | Image-Side Surface 42 | 1.172 | 0.25 | | | |
| Filter 7 | Object-Side Surface 71 | ∞ | 0.21 | 1.517 | 64.17 | |
| | Image-Side Surface 72 | ∞ | 0.6 | | | |

FIG.19

|  | Object-Side Surface (11) | Image-Side Surface (12) | Object-Side Surface (21) | Image-Side Surface (22) | Object-Side Surface (31) | Image-Side Surface (32) | Object-Side Surface (41) | Image-Side Surface (42) |
|---|---|---|---|---|---|---|---|---|
| k | 0.114 | 92.108 | 18.673 | -1.975 | -2.746 | -1.376 | -8.07 | -2.144 |
| A | -1.267 | 0.547 | -0.609 | 0.092 | -0.030 | 0.322 | -0.272 | -0.247 |
| B | 26.231 | -14.189 | 5.840 | -3.185 | -4.822 | -2.338 | 0.086 | 0.142 |
| C | -303.443 | 142.960 | -59.960 | 6.801 | 13.779 | 7.323 | -0.056 | -0.063 |
| D | 1990.323 | -839.359 | 326.624 | 7.236 | 14.723 | -11.404 | 0.108 | 0.019 |
| E | -7488.803 | 2779.947 | -1028.269 | -60.882 | -132.119 | 10.679 | -0.072 | -0.004 |
| F | 1.50*10^3 | -4887.550 | 1659.687 | 97.056 | 231.079 | -5.724 | 0.020 | 4.68*10^-4 |
| G | -1.24*10^4 | 3541.028 | -1032.771 | -49.126 | -137.843 | 1.33 | -0.002 | 2.53*10^-5 |
| H | 0 | 0 | 0 | 0 | 0 | 0 | 0 | 0 |
| J | 0 | 0 | 0 | 0 | 0 | 0 | 0 | 0 |

| | | Radius of Curvature (Radius) | Thickness (Thickness) | Refractive Index (Nd) | Abbe Number (Vd) | Focol Length |
|---|---|---|---|---|---|---|
| Fixed Aperture Stop 6 | | | -0.105 | | | |
| First Optical Lens Element 1 | Object-Side Surface 11 | 0.659 | 0.280 | 1.535 | 56.07 | 1.428 |
| | Image-Side Surface 12 | 4.040 | 0.149 | | | |
| Second Optical Lens Element 2 | Object-Side Surface 21 | -2.022 | 0.212 | 1.535 | 56.07 | 4.944 |
| | Image-Side Surface 22 | -1.189 | 0.044 | | | |
| Third Optical Lens Element 3 | Object-Side Surface 31 | -0.493 | 0.20 | 1.642 | 22.47 | 4.875 |
| | Image-Side Surface 32 | -0.495 | 0.02 | | | |
| Fourth Optical Lens Element 4 | Object-Side Surface 41 | 0.518 | 0.181 | 1.642 | 22.47 | -3.104 |
| | Image-Side Surface 42 | 0.356 | 0.10 | | | |
| Filter 7 | Object-Side Surface 71 | ∞ | 0.21 | 1.517 | 64.17 | |
| | Image-Side Surface 72 | ∞ | 0.10 | | | |
| Cover Glass 8 | Object-Side Surface 81 | ∞ | 0.40 | 1.517 | 64.17 | |
| | Image-Side Surface 82 | ∞ | 0.05 | | | |

| | Object-Side Surface (11) | Image-Side Surface (12) | Object-Side Surface (21) | Image-Side Surface (22) | Object-Side Surface (31) | Image-Side Surface (32) | Object-Side Surface (41) | Image-Side Surface (42) |
|---|---|---|---|---|---|---|---|---|
| k | 0.078 | 78.928 | 13.534 | -33.718 | -17.881 | -2.003 | -16.674 | -5.081 |
| A | -0.543 | -0.906 | -1.356 | -2.039 | -6.675 | -1.538 | -3.137 | -3.268 |
| B | 23.803 | 39.699 | -4.618 | -42.860 | 84.455 | 14.467 | -4.796 | 15.004 |
| C | -492.639 | -1344.107 | 123.776 | 2583.756 | 769.998 | 367.537 | 172.850 | -62.731 |
| D | 5742.273 | 2.34*10^4 | -4275.501 | -4.60*10^4 | -2.93*10^4 | -7935.572 | -1968.875 | 161.788 |
| E | -4.06*10^4 | -2.28*10^5 | 5.23*10^4 | 3.68*10^5 | 2.72*10^5 | 5.86*10^4 | 1.01*10^4 | -237.266 |
| F | 1.67*10^5 | 1.14*10^6 | -3.449*10^5 | -1.41*10^6 | -1.08*10^6 | -1.89*10^5 | -2.44*10^4 | 165.211 |
| G | -3.20*10^5 | -2.30*10^6 | 9.26*10^5 | 2.13*10^6 | 1.60*10^6 | 2.25*10^5 | 2.35*10^4 | -27.168 |
| H | 0 | 0 | 0 | 0 | 0 | 0 | 0 | 0 |
| J | 0 | 0 | 0 | 0 | 0 | 0 | 0 | 0 |

FIG.24

| | first embodiment | second embodiment | third embodiment | fourth embodiment | Fifth embodiment | sixth embodiment |
|---|---|---|---|---|---|---|
| F | 2.4 | 2.20 | 2.03 | 2.04 | 2.04 | 1.82 |
| f | 2.53 | 2.26 | 2.6 | 1.62 | 2.11 | 1.30 |
| f1 | 2.96 | 2.88 | 3.20 | 1.75 | 2.61 | 1.43 |
| HFOV | 41.4 | 44.7 | 40.8 | 36.8 | 44 | 37.6 |
| HI | 0.2252 | 0.0773 | 0.2485 | 0.1601 | 0.2352 | 0.2151 |
| DR | 0.0026 | 5.45E-05 | 0.0027 | 0.0016 | 0.0034 | 0.0051 |
| TTL | 3.39 | 3.35 | 3.90 | 2.18 | 3.41 | 1.88 |
| CT1 | 0.375 | 0.328 | 0.396 | 0.307 | 0.336 | 0.28 |
| CT2 | 0.324 | 0.473 | 0.498 | 0.28 | 0.530 | 0.212 |
| T12 | 0.309 | 0.257 | 0.355 | 0.185 | 0.298 | 0.149 |
| |Sag12| | 0.017 | 0.0578 | 0.0287 | 0.0098 | 0.015 | 0.0002 |
| R1 | 1.352 | 1.5 | 1.497 | 0.852 | 1.226 | 0.659 |
| R2 | 8.225 | 45.705 | 9.529 | 6.802 | 8.825 | 4.04 |
| ΣCT | 1.53 | 1.71 | 2.27 | 1.12 | 1.845 | 0.872 |
| TD | 2.14 | 2.11 | 2.45 | 1.32 | 2.248 | 0.980 |
| SL | 3.29 | 3.28 | 3.77 | 2.08 | 3.309 | 1.775 |
| |TVD| | 0.63 | 0.63 | 0.35 | 0.63 | 0.35 | 1.08 |
| ImgH | 2.297 | 2.268 | 2.3 | 1.2337 | 2.268 | 1.028 |
| DC | 1.0325 | 1.211 | 1.407 | 0.556 | 1.1988 | 0.4157 |
| f/f1 | 0.855 | 0.785 | 0.813 | 0.926 | 0.808 | 0.909 |
| TTL/f | 1.34 | 1.482 | 1.5 | 1.346 | 1.616 | 1.446 |
| |Sag12|/ct1 | 0.045 | 0.176 | 0.072 | 0.032 | 0.045 | 0.001 |
| DR/|sag12| | 0.153 | 0.001 | 0.094 | 0.163 | 0.227 | 25.5 |
| (R1-R2)/(R1+R2) | -0.718 | -0.936 | -0.728 | -0.777 | -0.756 | -0.72 |
| T12/f | 0.122 | 0.114 | 0.137 | 0.114 | 0.141 | 0.115 |
| (CT2+T12)/(CT1) | 1.688 | 2.226 | 2.154 | 1.515 | 2.464 | 1.289 |
| ΣCT/TD | 0.715 | 0.81 | 0.927 | 0.848 | 0.821 | 0.89 |
| TD/TTL | 0.631 | 0.63 | 0.628 | 0.606 | 0.659 | 0.521 |
| SL/TTL | 0.971 | 0.979 | 0.967 | 0.954 | 0.97 | 0.944 |
| TTL/ImgH | 1.475 | 1.477 | 1.695 | 1.767 | 1.503 | 1.829 |
| DC/ImgH | 0.449 | 0.534 | 0.612 | 0.451 | 0.529 | 0.404 |

FIG.25

IMAGING LENS ASSEMBLY

CROSS-REFERENCE TO RELATED APPLICATION

This application claims priority of Taiwanese Application No. 103129695, filed on Aug. 28, 2014.

FIELD

The present invention relates to an imaging lens assembly.

BACKGROUND

An imaging lens set is generally adopted in a mobile phone, a smart phone, a tablet computer, a notebook computer or an imaging lens assembly. With the rapid development of technology, these electronic devices are designed to be increasingly thinner. Therefore, the imaging lens set for these electronic devices should be made correspondingly smaller as well. Moreover, the imaging lens set should be developed more wide-angle in order to further improve the imaging quality thereof, such as a resolution of 1920*1080 full HD (High Definition).

A conventional imaging lens assembly including four lenses does not satisfy the thin and wide-angle requirements.

SUMMARY

Therefore, an object of the present disclosure is to provide an imaging lens assembly that has an alternative four-lens structure.

Accordingly, an imaging lens assembly includes a first optical lens element, a second optical lens element, a third optical lens element and a fourth optical lens element that are arranged sequentially from an object side to an image side along an optical axis of the imaging lens assembly.

The first optical lens element has a positive refractive power near the optical axis. The first optical lens element has an object-side surface that faces the object side, an image-side surface that faces the image side, and a peripheral surface that interconnects the object-side surface and the image-side surface of the first optical lens element. The image-side surface of the first optical lens element has at least one inflection point between the optical axis and the peripheral surface. The second optical lens element has a refractive power, and has an object-side surface that faces the object side and an image-side surface that faces the image side. The third optical lens element has a refractive power, and has an object-side surface that faces the object side and an image-side surface that faces the image side. The fourth optical lens element has a refractive power, and has an object-side surface that faces the object side and an image-side surface that faces the image side.

The refractive power of at least one of the second, third and fourth optical lens elements is positive near the optical axis. At least one of the object-side surface and the image-side surface of at least one of the second, third and fourth optical lens elements is aspheric.

The imaging lens assembly satisfies the following optical conditions:

$$0.7 \leq |f/f1| \leq 1.0, \text{ and}$$

$$HFOV \geq 35 \text{ deg,}$$

in which, f represents a focal length of the imaging lens assembly, f1 represents a focal length of the first optical lens element, and HFOV stands for half field-of-view of the imaging lens assembly.

BRIEF DESCRIPTION OF THE DRAWINGS

Other features and advantages of the present disclosure will become apparent in the following detailed description of the embodiments with reference to the accompanying drawings, of which:

FIG. 3 shows a table of optical parameters for optical lens elements, a fixed aperture stop and a filter of the first embodiment;

FIG. 4 shows a table of parameters for aspheric surfaces of the first embodiment;

FIG. 7 shows a table of optical parameters for optical lens elements, a fixed aperture stop and a filter of the second embodiment;

FIG. 8 shows a table of parameters for aspheric surfaces of the second embodiment;

FIG. 11 shows a table of optical parameters for optical lens elements, a fixed aperture stop and a filter of the third embodiment;

FIG. 12 shows a table of parameters for aspheric surfaces of the third embodiment;

FIG. 15 shows a table of optical parameters for optical lens elements, a fixed aperture stop and a filter of the fourth embodiment;

FIG. 16 shows a table of parameters for aspheric surfaces of the fourth embodiment;

FIG. 19 shows a table of optical parameters for optical lens elements, a fixed aperture stop and a filter of the fifth embodiment;

FIG. 20 shows a table of parameters for aspheric surfaces of the fifth embodiment;

FIG. 23 shows a table of optical parameters for optical lens elements, a fixed aperture stop, a filter and a cover glass of the sixth embodiment;

FIG. 24 shows a table of parameters for aspheric surfaces of the sixth embodiment; and FIG. 25 shows a table of optical parameters for the first through sixth embodiments according to the present disclosure.

DETAILED DESCRIPTION

Figure 1:
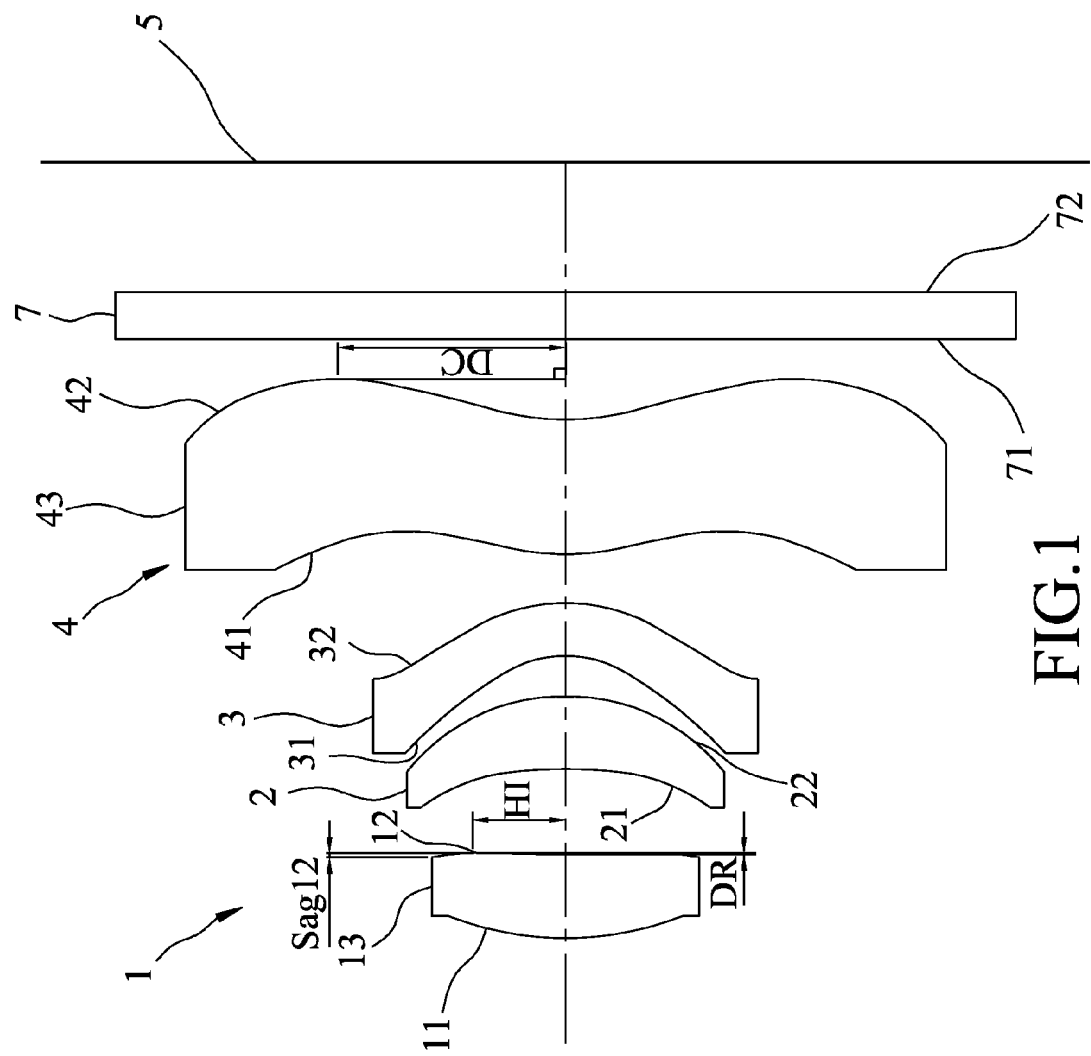
FIG. 1 is a schematic view of a first embodiment of an imaging lens assembly according to the present disclosure.

Before the present disclosure is described in greater detail, it should be noted that like elements are denoted by the same reference numerals throughout the disclosure.

Referring to FIG. 1, a schematic view of a first embodiment of an imaging lens assembly according to the present disclosure is shown to include a first optical lens element 1, a second optical lens element 2, a third optical lens element 3 and a fourth optical lens element 4 that are arranged sequentially from an object side to an image side along an optical axis of the imaging lens assembly. The imaging lens assembly is capable of forming an image on an imaging plane 5. The imaging lens assembly further includes a filter 7 that is disposed between the fourth optical lens element 4 and the imaging plane 5, a fixed aperture stop (not shown), and an image sensing unit (not shown) that is disposed at the imaging plane 5.

The first optical lens element 1 in this embodiment has a positive refractive power near the optical axis. The first optical lens element 1 has an object-side surface 11 that faces the object side, an image-side surface 12 that faces the image side, and a peripheral surface 13 that interconnects the object-side surface 11 and the image-side surface 12 of the first optical lens element 1. The image-side surface 12 of the first optical lens element 1 has at least one inflection point between the optical axis and the peripheral surface 13.

The second optical lens element 2 in this embodiment has a refractive power. The second optical lens element 2 has an object-side surface 21 that faces the object side and an image-side surface 22 that faces the image side.

The third optical lens element 3 in this embodiment has a refractive power. The third optical lens element 3 has an object-side surface 31 that faces the object side and an image-side surface 32 that faces the image side.

The fourth optical lens element 4 has a refractive power. The fourth optical lens element 4 has an object-side surface 41 that faces the object side, and an image-side surface 42 that faces the image side. The image-side surface 42 of the fourth optical lens element 4 has a critical point at which a plane perpendicular to the optical axis is tangential.

At least one optical lens element out of the second, third and fourth optical lens elements 2, 3, 4 has a positive refractive power near the optical axis. In this embodiment, the refractive power of the second optical lens element 2 is positive near the optical axis, and the refractive power of the third optical lens element 3 is negative near the optical axis.

In this embodiment, at least one of the object-side surfaces 11, 21, 31, 41 and the image-side surfaces 12, 22, 32, 42 of at least one of the first, second, third and fourth optical lens elements 1, 2, 3, 4 is aspheric, and satisfies the following equation:

$$z = \frac{ch^2}{1+[1-(k+1)c^2h^2]^{0.5}} + Ah^4 + Bh^6 + Ch^8 + Dh^{10} + Eh^{12} + Fh^{14} + Gh^{16} + Hh^{18} + Jh^{20} + \ldots ,$$ (eq 1)

in which, z is the z-component of the displacement of the aspheric surface from the vertex of the aspheric surface along the optical axis, at a distance h from the optical axis; k is a conic constant; c is the reciprocal of a radius of curvature; and A, B, C, D, E, F, G, H and J, etc. are aspheric coefficients. It is understood that at least one of the object-side surface 11 and the image-side surface 12 of the first optical lens element 1 may be spherical in other embodiments of the present disclosure. In other words, it would be sufficient to have at least one of the object-side surfaces 21, 31, 41 and the image-side surfaces 22, 32, 42 of at least one of the second, third and fourth optical lens elements 1, 2, 3, 4 to be aspheric.

The imaging lens assembly of the present disclosure satisfies the following equations:

$0.7 \leq |f/f1| \leq 1.0$ (eq2), $HFOV \geq 35$ deg (eq3), $1.3 \leq TTL/f \leq 1.65$ (eq4), $TTL \leq 4.6$ mm (eq5), $0 \leq HI \leq 0.5$ mm (eq6), $0 \leq DR \leq 0.05$ mm (eq7), $0 \leq |Sag12|/CT1 \leq 0.2$ (eq8), $0 \leq DR/|Sag12| \leq 30$ (eq9), $-1.0 \leq (R1-R2)/(R1+R2) \leq -0.65$ (eq10), $0.1 \leq T12/f \leq 0.16$ (eq11), $1.0 \leq (CT2+T12)CT1 \leq 3.0$ (eq12), $35$ deg $\leq HFOV \leq 50$ deg (eq13), $0.70 \leq \Sigma CT/TD \leq 0.95$ (eq14), $0.5 \leq TD/TTL \leq 0.7$ (eq15), $0.9 \leq SL/TTL \leq 1.0$ (eq16), $1.5 \leq F \leq 2.9$ (eq17), $1.4 \leq TTL/ImgH \leq 1.9$ (eq18), $0.3 \leq DC/ImgH \leq 0.7$ (eq19), $|TVD| < 1.5\%$ (eq20), in which, f represents a focal length of the imaging lens assembly, f1 represents a focal length of the first optical lens element 1, HFOV stands for half field-of-view of the imaging lens assembly, TTL represents a distance between the object-side surface 11 of the first optical lens element 1 and the imaging plane 5 along the optical axis, HI represents a minimum distance between the inflection point of the image-side surface 12 of the first optical lens element 1 and the optical axis, DR represents a distance along the optical axis between the image-side surface 12 of the first optical lens element 1 and a reference point at which an imaginary line perpendicular to the optical axis and crossing the inflection point of the image-side surface 12 of the first optical lens element 1 crosses the optical axis, Sag12 represents a distance along the optical axis between an axial point of the image-side surface 12 of the first optical lens element 1 and a projection on the optical axis of a point of maximum effective diameter of the image-side surface 12 of the first optical lens element 1, R1 represents a radius of curvature of the object-side surface 11 of the first optical lens element 1 near the optical axis, R2 represents a radius of curvature of the image-side surface 12 of the first optical lens element 1 near the optical axis, T12 represents a distance between the first optical lens element 1 and the second optical lens element 2 along the optical axis, CT1 and CT2 represent thicknesses of the first optical lens element 1 and the second optical lens element 2 along the optical axis, respectively, $\Sigma$CT represents a sum of thicknesses of any optical lens element with a refractive power (i.e., the first, second, third and fourth optical lens elements 1, 2, 3, 4) along the optical axis, TD represents a distance between the object-side surface 11 of the first optical lens element 1 and the image-side surface 42 of the fourth optical lens element 4 along the optical axis, SL represents a distance between the fixed aperture stop and the imaging plane 5 along the optical axis, F represents an f-number of the imaging lens assembly, ImgH represents half of a length of a diagonal line of an effective sensing area of the image sensing unit, DC represents a minimum distance between the critical point and the optical axis, TVD represents a TV distortion of the imaging lens assembly when an image is formed.

Figure 2:
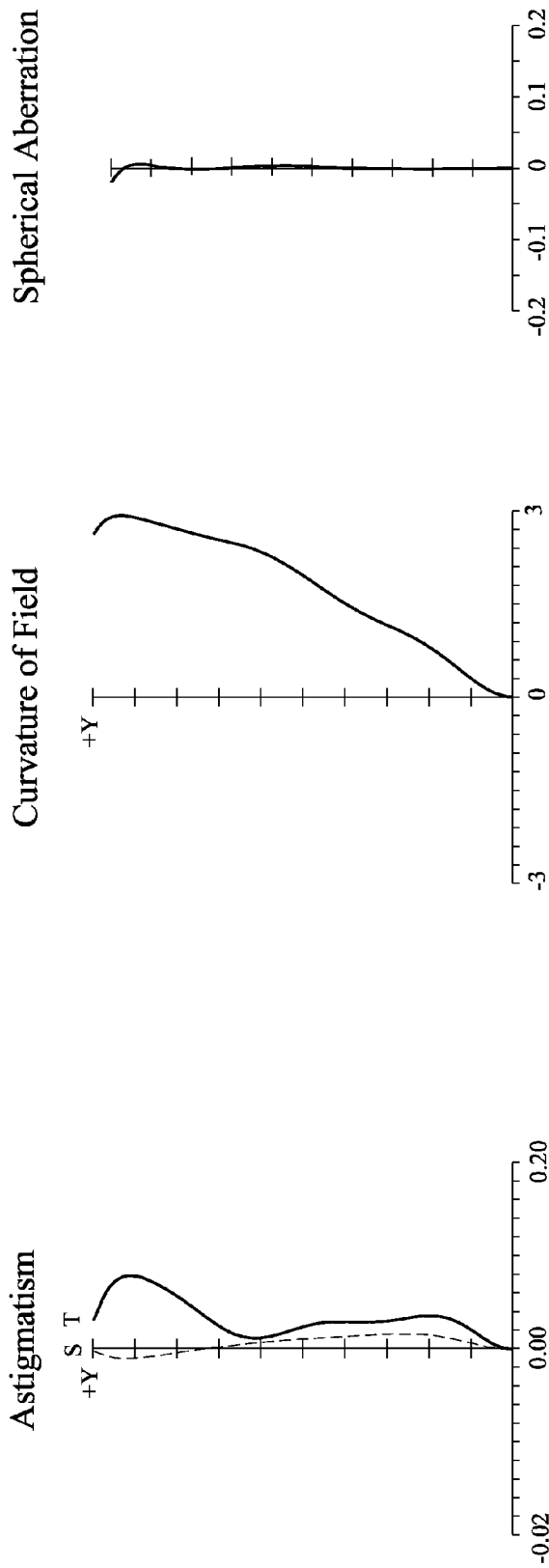
FIG. 2 shows simulation results of optical astigmatism, curvature of field and spherical aberration of the first embodiment.
Figure 5:
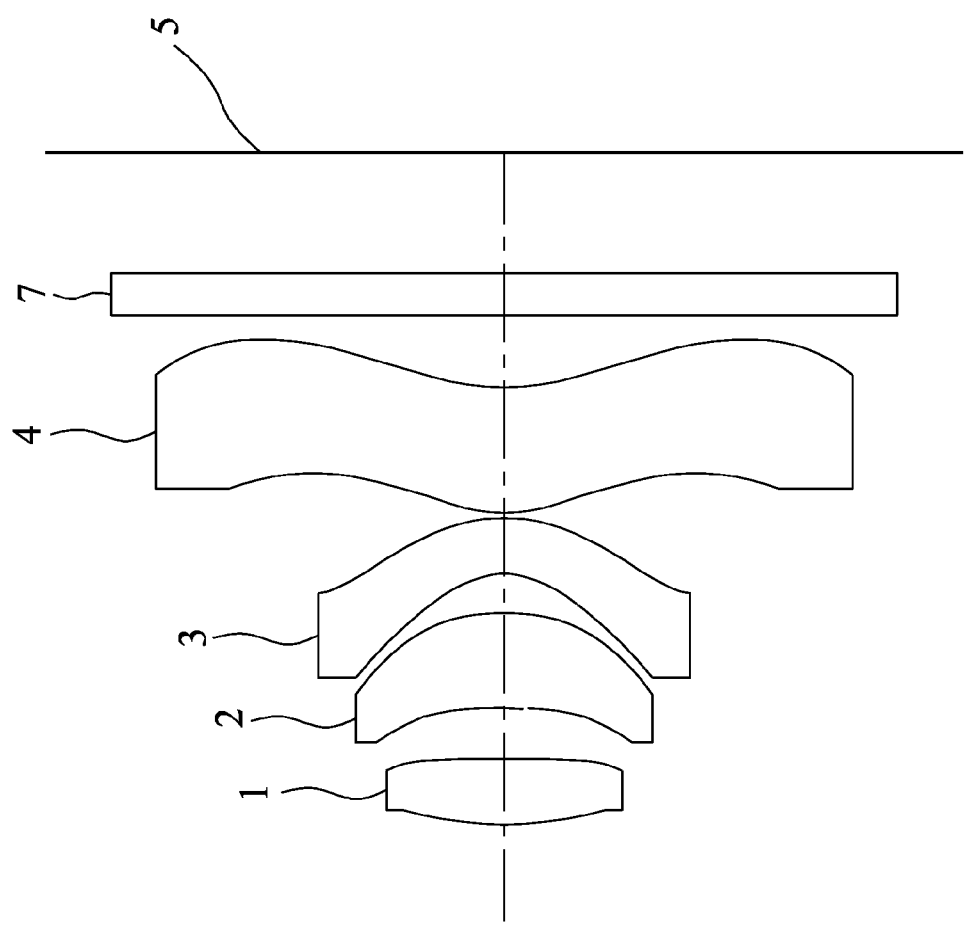
FIG. 5 is a schematic view of a second embodiment of an imaging lens assembly according to the present disclosure.
Figure 6:
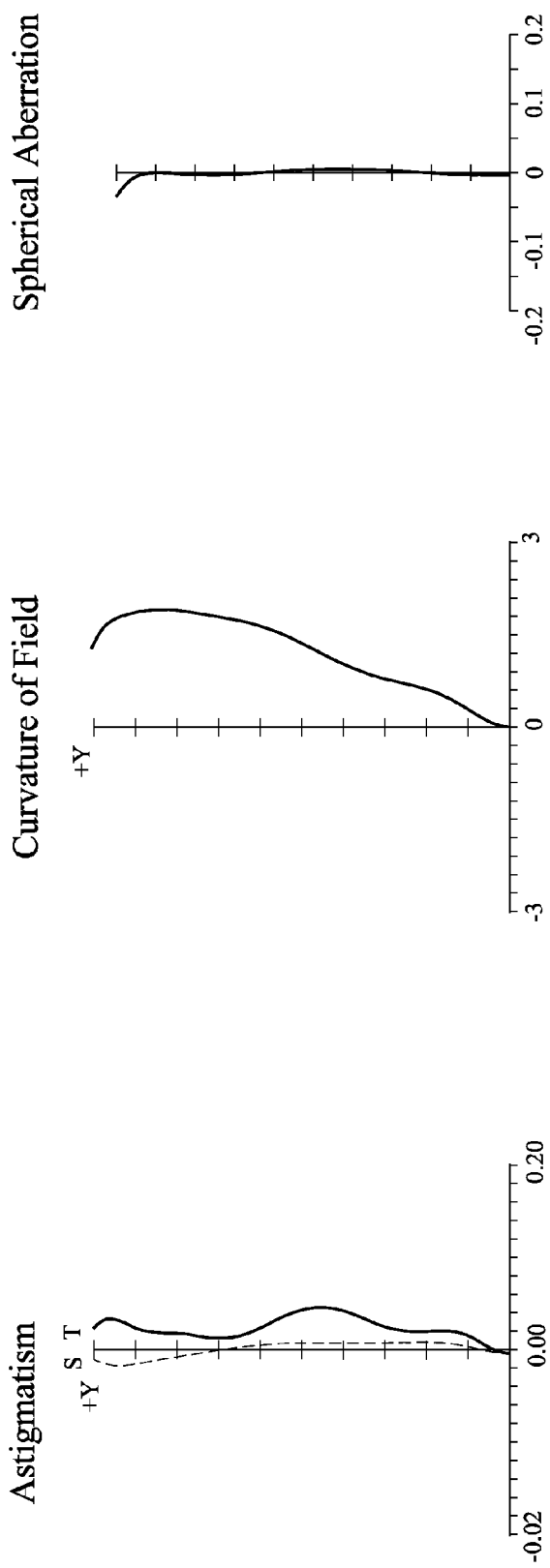
FIG. 6 shows simulation results of optical astigmatism, curvature of field and spherical aberration of the second embodiment.
Figure 9:
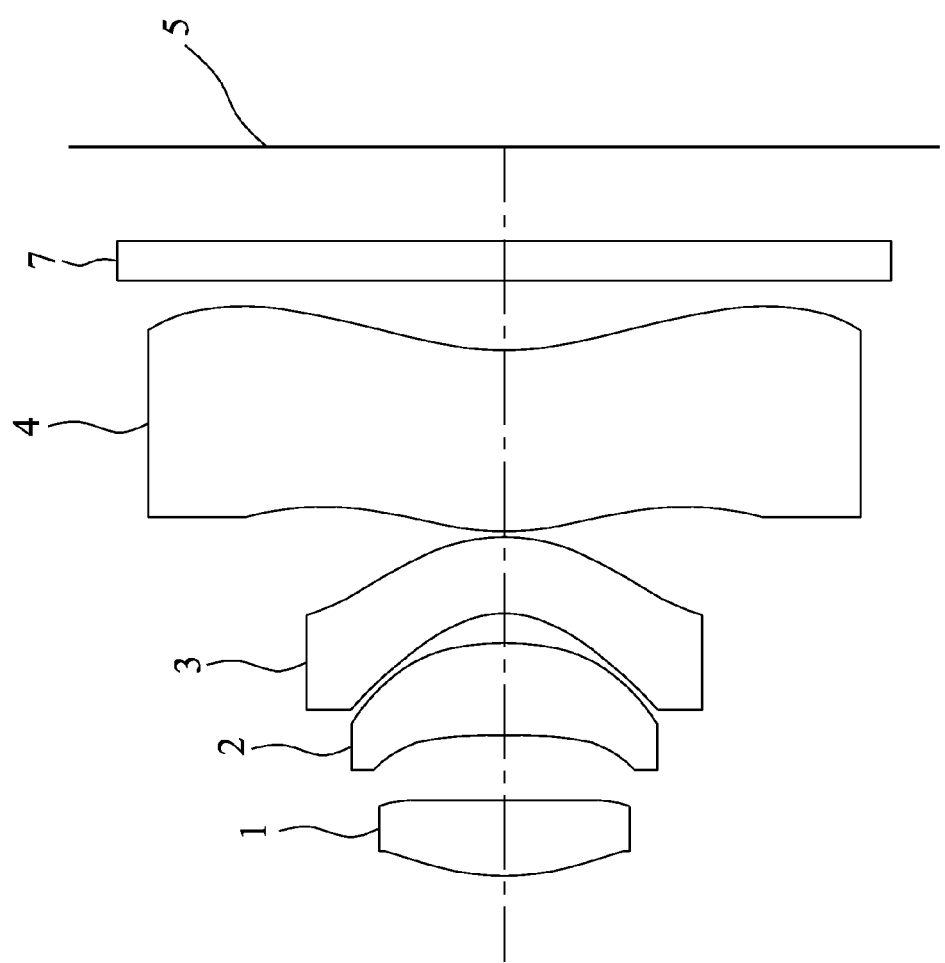
FIG. 9 is a schematic view of a third embodiment of an imaging lens assembly according to the present disclosure.
Figure 10:
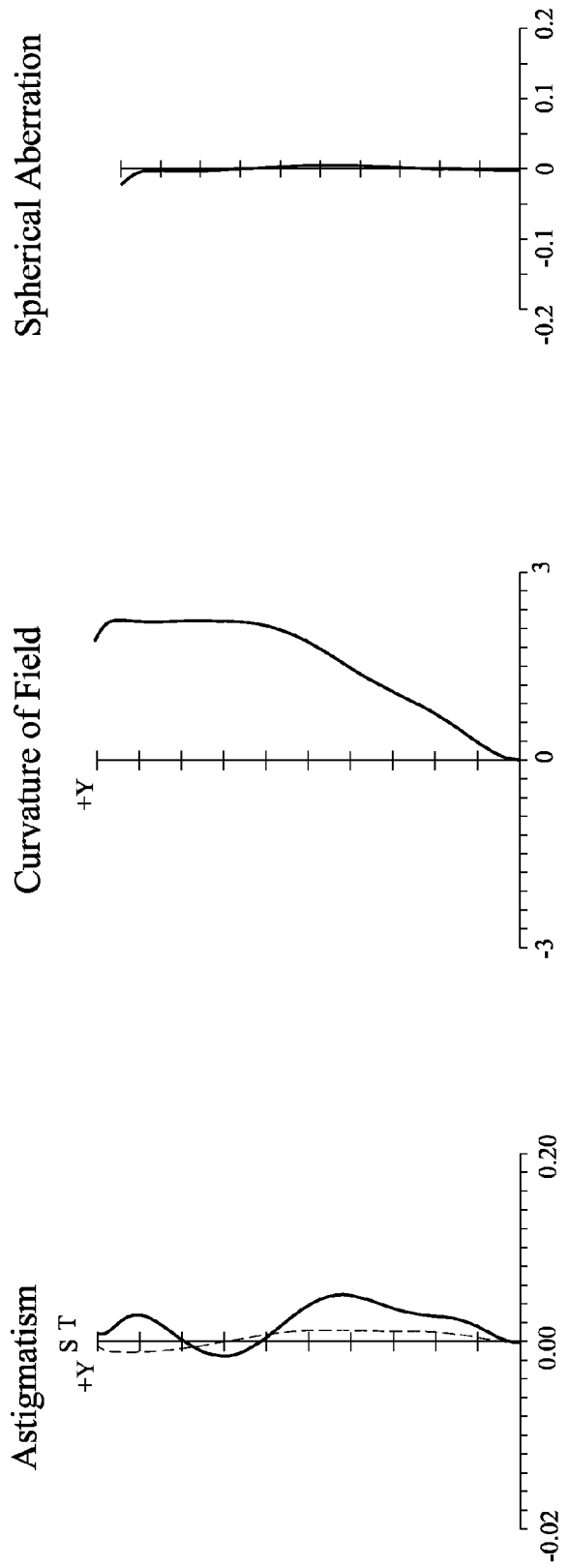
FIG. 10 shows simulation results of optical astigmatism, curvature of field and spherical aberration of the third embodiment.
Figure 13:
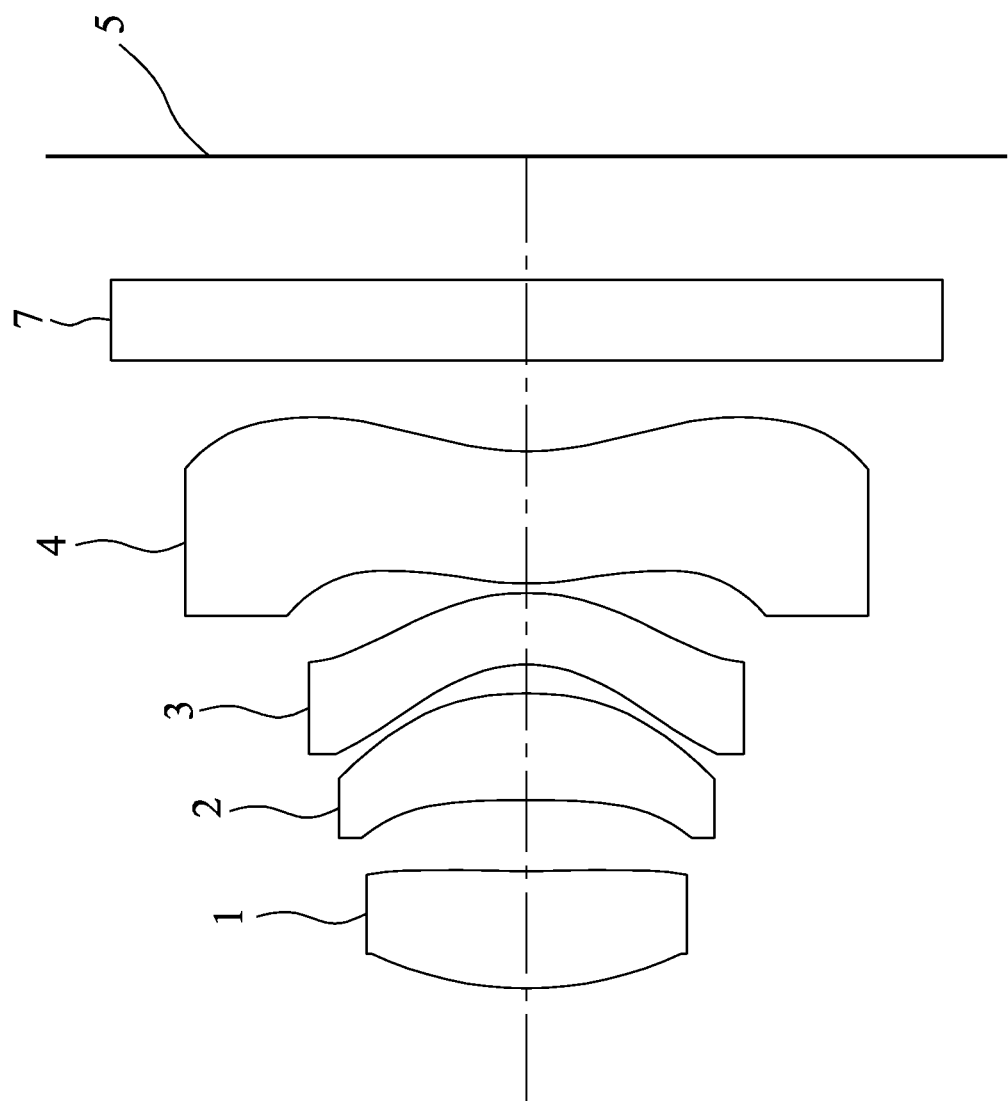
FIG. 13 is a schematic view of a fourth embodiment of an imaging lens assembly according to the present disclosure.
Figure 14:
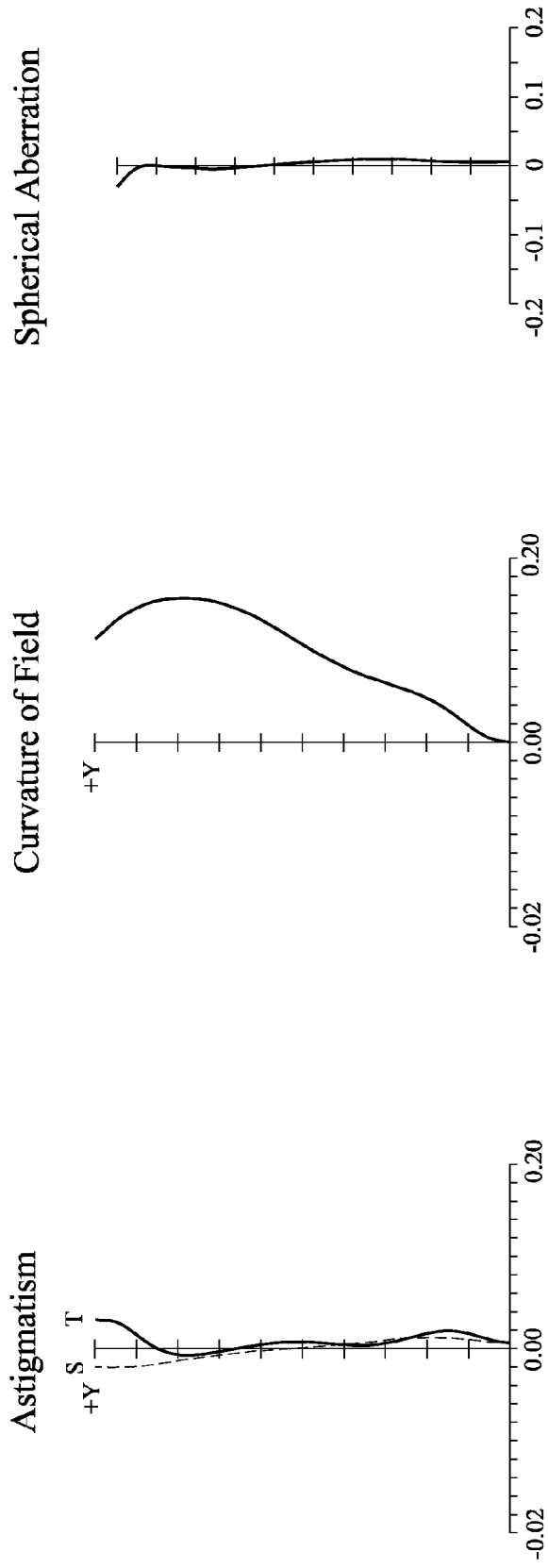
FIG. 14 shows simulation results of optical astigmatism, curvature of field and spherical aberration of the fourth embodiment.
Figure 17:
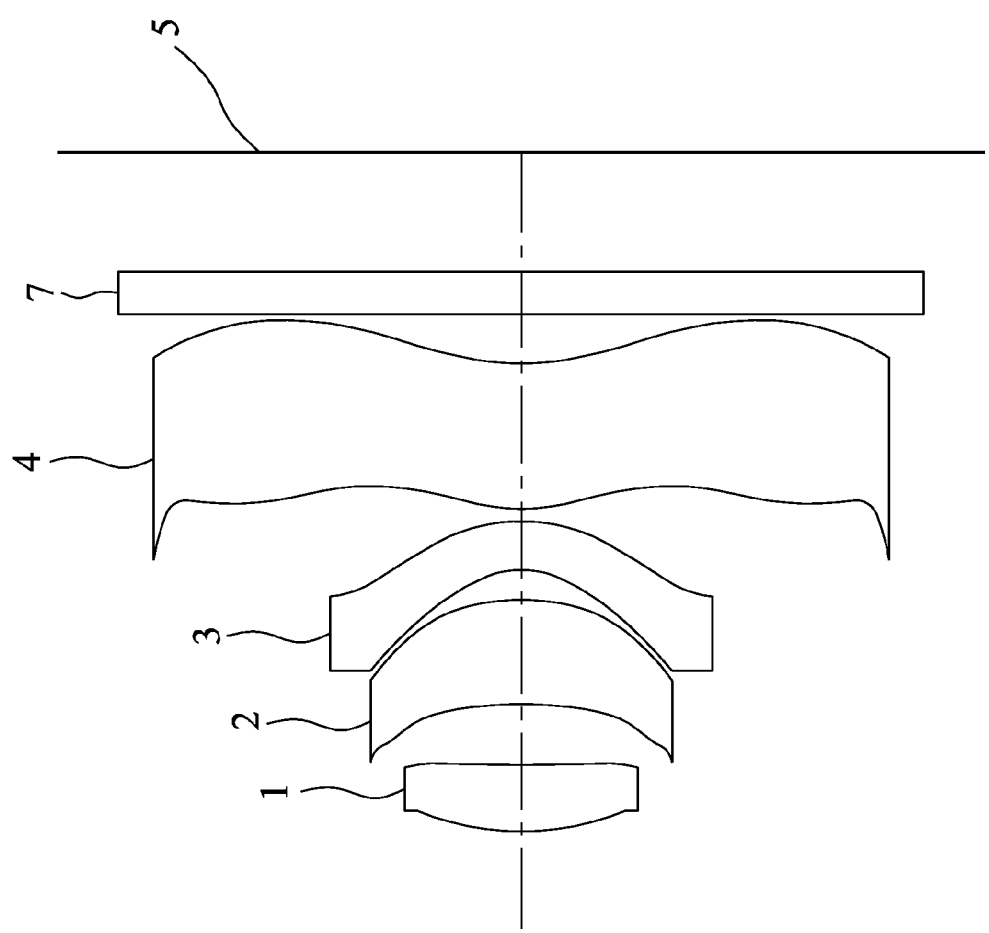
FIG. 17 is a schematic view of a fifth embodiment of an imaging lens assembly according to the present disclosure.
Figure 18:
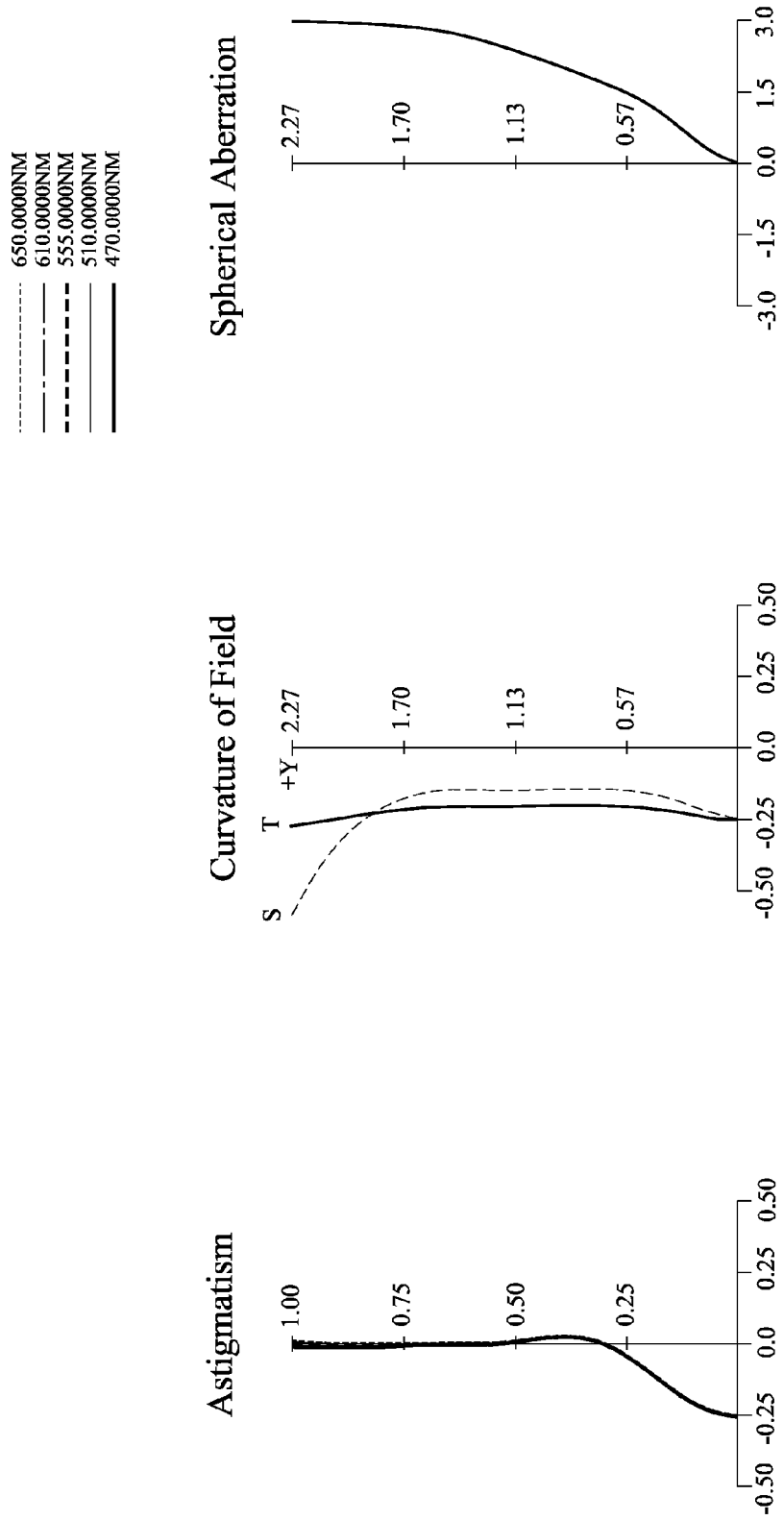
FIG. 18 shows simulation results of optical astigmatism, curvature of field and spherical aberration of the fifth embodiment.
Figure 21:
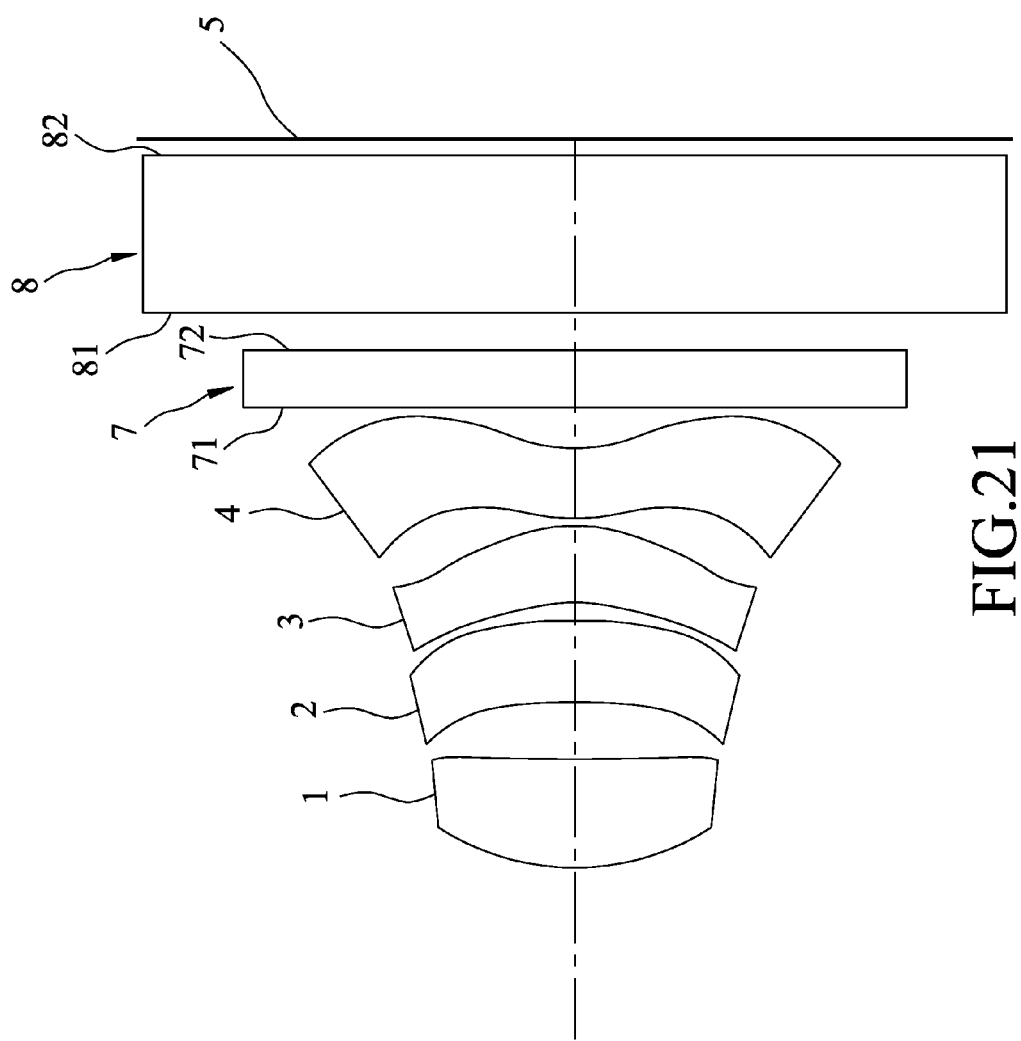
FIG. 21 is a schematic view of a sixth embodiment of an imaging lens assembly according to the present disclosure.
Figure 22:
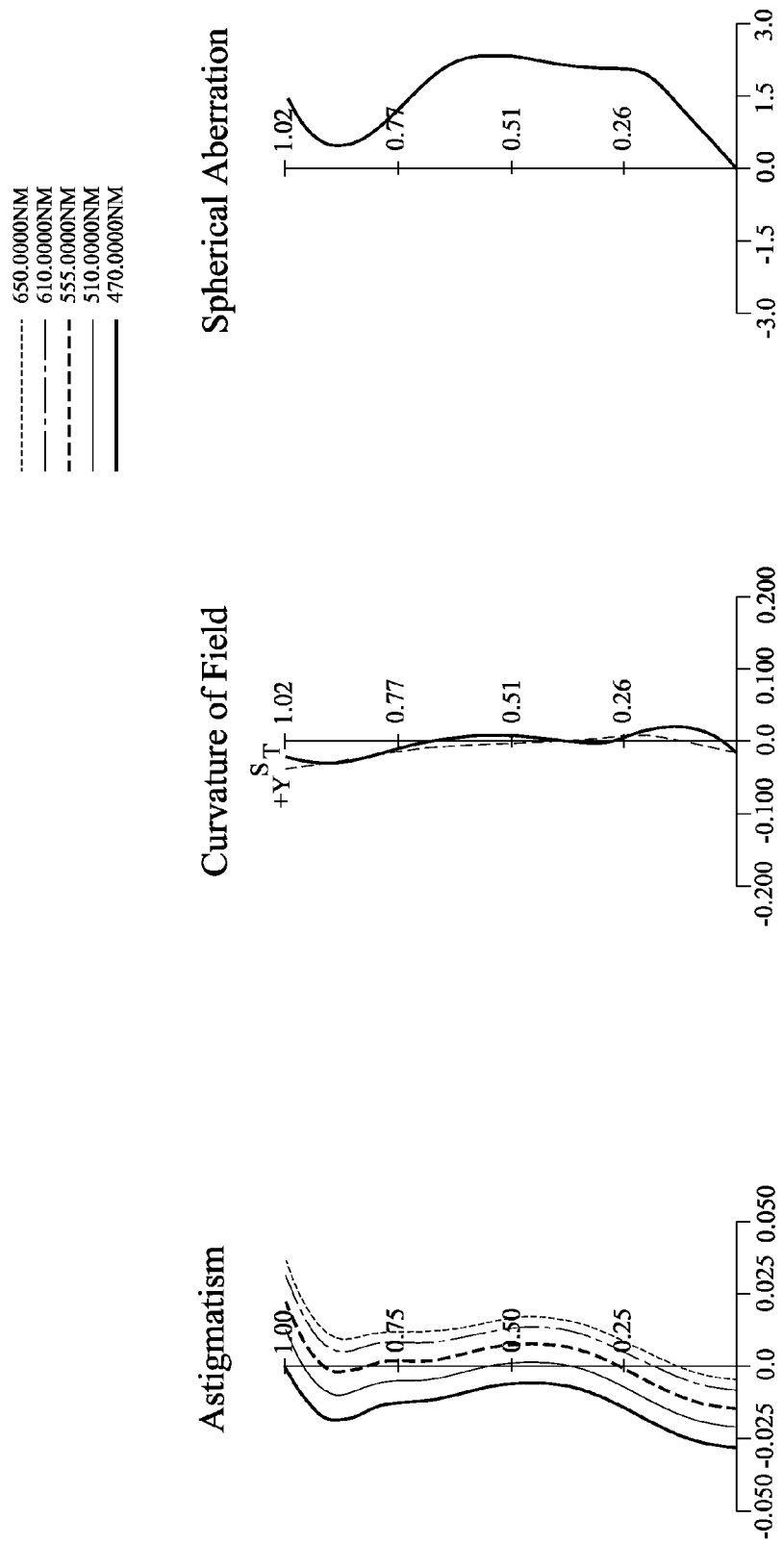
FIG. 22 shows simulation results of optical astigmatism, curvature of field and spherical aberration of the sixth embodiment.

FIG. 3 shows a table of optical parameters for the optical lens elements 1, 2, 3, 4 and the filter 7 of the first embodiment. Specifically, the optical parameters include radius of curvature, thickness, refractive index, Abbe number and focal length. FIG. 4 shows a table of parameters for aspheric surfaces 11, 12, 21, 22, 31, 32, 41, 42 of the first embodiment. With the optical parameters set as illustrated, simulation results of optical astigmatism, curvature of field and spherical aberration of the first embodiment are shown in FIG. 2.

Referring to FIGS. 5 to 8 (a second embodiment), FIGS. 9 to 12 (a third embodiment), FIGS. 13 to 16 (a fourth embodiment), FIGS. 17 to 20 (a fifth embodiment) and FIGS. 21 to 24 (a sixth embodiment), alternative structures of the imaging lens assembly and optical parameters thereof according to the present disclosure are provided, respectively. It is noted herein that in the sixth embodiment, a cover glass 8 having an object-side surface 81 and an image-side surface 82 is disposed between the filter 7 and the imaging plane 5.

The values of the optical parameters for the first through sixth embodiments of the optical lens assembly as shown in FIG. 25 are obtainable based on the parameters given in FIGS. 3, 4, 7, 8, 11, 12, 15, 16, 19, 20, 23 and 24, satisfying the Equations 2 to 20 (eq2 to eq20).

To conclude, by virtue of the imaging lens assembly of the present disclosure that satisfies the Equations 2 to 20 (eq2 to eq20), a resolution and an angle of view of the imaging lens assembly may be increased, and the overall thickness of the imaging lens assembly may be decreased.

While the present disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An imaging lens assembly, comprising:
first, second, third and fourth optical lens elements that are arranged sequentially from an object side to an image side along an optical axis of said imaging lens assembly,
said first optical lens element having a positive refractive power near the optical axis, said first optical lens element having an object-side surface that faces the object side, an image-side surface that faces the image side, and a peripheral surface that interconnects said object-side surface and said image-side surface of said first optical lens element, said image-side surface of said first optical lens element having at least one inflection point between the optical axis and said peripheral surface,
said second optical lens element having a refractive power and having an object-side surface that faces the object side and an image-side surface that faces the image side,
said third optical lens element having a refractive power and having an object-side surface that faces the object side and an image-side surface that faces the image side,
said fourth optical lens element having a refractive power, an object-side surface that faces the object side of an image-side surface that faces the image side, and a peripheral surface that interconnect said object-side surface and said image-side surface of said fourth optical lens element, said object-side surface of said fourth optical lens element having at least one inflection point between the optical axis and said peripheral surface of said fourth optical lens element,
the refractive power of at least one of said second, third and fourth optical lens elements being positive near the optical axis,
at least one of said object-side surface and said image-side surface of at least one of said second, third and fourth optical lens elements being aspheric;
wherein said imaging lens assembly satisfied the following optical conditions:

$0.7 \leq |f/f1| \leq 1.0$, and $HFOV \geq 35$ deg, in which, f represents a focal length of said imaging lens assembly, f1 represents a focal length of said first optical lens element, and HFOV stands for half field-of-view of said imaging lens assembly.

2. The imaging lens assembly as claimed in claim 1, further satisfying the following optical conditions:

$1.3 \leq TTL/f \leq 1.65$, and $TTL \leq 4.6$ mm, in which, TTL represents a distance between said object-side surface of said first optical lens element and an imaging plane along the optical axis.

3. The imaging lens assembly as claimed in claim 1, further satisfying the following optical condition:

$0 \leq HI \leq 0.5$ mm, in which, HI represents a minimum distance between the inflection point of said image-side surface of said first optical lens element and the optical axis.

4. The imaging lens assembly as claimed in claim 3, further satisfying the following optical condition:

$0 \leq DR \leq 0.05$ mm, in which, DR represents a distance along the optical axis between said image-side surface of said first optical lens element and a reference point at which an imaginary line perpendicular to the optical axis and crossing the inflection point of said image-side surface of said first optical lens element crosses the optical axis.

5. The imaging lens assembly as claimed in claim 4, further satisfying the following optical condition:

$$0 \leq |Sag12|/CT1 \leq 0.2,$$

in which, Sag12 represents a distance along the optical axis between an axial point of said image-side surface of said first optical lens element and a projection on the optical axis of a point of maximum effective diameter of said image-side surface of said first optical lens element, and CT1 represents a thickness of said first optical lens element along the optical axis.

6. The imaging lens assembly as claimed in claim 4 or claim 5, further satisfying the following optical conditions:

$$0 \leq DR/|Sag12| \leq 30.$$

7. The imaging lens assembly as claimed in claim 1, further satisfying the following optical condition:

$$-1.0 \leq (R1-R2)/(R1+R2) \leq -0.65,$$

in which, R1 represents a radius of curvature of said object-side surface of said first optical lens element near the optical axis, and R2 represents a radius of curvature of said image-side surface of said first optical lens element near the optical axis.

8. The imaging lens assembly as claimed in claim 1, further satisfying the following optical condition:

$$0.1 \leq T12/f \leq 0.16,$$

in which, T12 represents a distance between said first optical lens element and said second optical lens element along the optical axis.

9. The imaging lens assembly as claimed in claim 1, further satisfying the following optical condition:

$$1.0 \leq (CT1+T12)/CT1 \leq 3.0,$$

in which, T12 represents a distance between said first optical lens element and said second optical lens element along the optical axis, and CT1 and CT2 represent thicknesses of said first optical lens element and said second optical lens element along the optical axis, respectively.

10. The imaging lens assembly as claimed in claim 1, further satisfying the following optical condition:

$$35 \text{ deg} \leq HFOV \leq 50 \text{ deg},$$

in which, HFOV stands for half field-of-view of said imaging lens assembly.

11. The imaging lens assembly as claimed in claim 1, wherein the refractive power of said second optical lens element is positive near the optical axis.

12. The imaging lens assembly as claimed in claim 11, wherein the refractive power of said third optical lens element is negative near the optical axis.

13. The imaging lens assembly as claimed in claim 1, further satisfying the following optical condition:

$$0.70 \leq \Sigma CT/TD \leq 0.95,$$

in which, ΣCT represents a sum of thicknesses of said first, second, third and fourth optical lens elements along the optical axis, and TD represents a distance between said object-side surface of said first optical lens element and said image-side surface of said fourth optical lens element along the optical axis.

14. The imaging lens assembly as claimed in claim 1, further satisfying the following optical condition:

$$0.5 \leq TD/TTL \leq 0.7,$$

in which, TD represents a distance between said object-side surface of said first optical lens element and said image-side surface of said fourth optical lens element along the optical axis, and TTL represents a distance between said object-side surface of said first optical lens element and an imaging plane along the optical axis.

15. The imaging lens assembly as claimed in claim 1, further comprising a fixed aperture stop and further satisfying the following optical condition:

$$0.9 \leq SL/TTL \leq 1.0,$$

in which, SL represents a distance between said fixed aperture stop and an imaging plane along the optical axis, and TTL represents a distance between said object-side surface of said first optical lens element and said imaging plane along the optical axis.

16. The imaging lens assembly as claimed in claim 15, further satisfying the following optical condition:

$$1.5 \leq F \leq 2.9,$$

in which, F represents an f-number of said imaging lens assembly.

17. The imaging lens assembly as claimed in claim 15, further comprising an image sensing unit that is disposed at the imaging plane and further satisfying the following optical condition:

$$1.4 \leq TTL/ImgH \leq 1.9,$$

in which, ImgH represents half of a length of a diagonal line of an effective sensing area of said image sensing unit.

18. The imaging lens assembly as claimed in claim 17, wherein said image-side surface of said fourth optical lens element has a critical point at which a plane perpendicular to the optical axis is tangential, said imaging lens assembly further satisfying the following optical condition:

$$0.3 \leq DC/ImgH \leq 2.9,$$

in which, DC represents a minimum distance between the critical point and the optical axis.

19. The imaging lens assembly as claimed in claim 1, further satisfying the following optical condition:

$$|TVD| < 1.5\%,$$

in which, TVD represents a TV distortion of said imaging lens assembly when an image is formed.

* * * * *